US010052762B2

(12) United States Patent
Inoue et al.

(10) Patent No.: US 10,052,762 B2
(45) Date of Patent: Aug. 21, 2018

(54) METHOD OF CONTROLLING ROBOT WITH HAND GRIPPING TWO WORKPIECES AND ROBOT CONTROL APPARATUS

(71) Applicant: FANUC CORPORATION, Yamanashi (JP)

(72) Inventors: Toshihiko Inoue, Yamanashi (JP); Shunsuke Abiko, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 65 days.

(21) Appl. No.: 15/208,607

(22) Filed: Jul. 13, 2016

(65) Prior Publication Data
US 2017/0014999 A1   Jan. 19, 2017

(30) Foreign Application Priority Data
Jul. 17, 2015   (JP) .................................. 2015-142898

(51) Int. Cl.
*G06F 19/00*   (2018.01)
*B25J 9/16*   (2006.01)

(52) U.S. Cl.
CPC ... *B25J 9/1651* (2013.01); *G05B 2219/40454* (2013.01)

(58) Field of Classification Search
CPC ............... B25J 9/1651; G05B 2219/40454
USPC ...................................................... 700/245
See application file for complete search history.

(56) References Cited

U.S. PATENT DOCUMENTS

| 4,587,716 | A | * | 5/1986 | Bytow | B21D 37/145 |
| | | | | | 483/14 |
| 4,645,411 | A | * | 2/1987 | Madwed | B25J 15/02 |
| | | | | | 198/468.2 |
| 4,674,949 | A | * | 6/1987 | Kroczynski | B25J 5/00 |
| | | | | | 114/222 |
| 8,843,237 | B2 | * | 9/2014 | Aurnhammer | G05B 19/416 |
| | | | | | 700/262 |
| 8,855,823 | B2 | * | 10/2014 | Kirihara | B25J 9/1653 |
| | | | | | 700/258 |
| 9,037,293 | B2 | * | 5/2015 | Gomi | B25J 9/1638 |
| | | | | | 623/24 |
| 9,339,933 | B2 | * | 5/2016 | Asada | B25J 9/1651 |
| 9,421,687 | B2 | * | 8/2016 | Nakajima | B25J 9/1633 |
| 9,452,529 | B2 | * | 9/2016 | Niu | B25J 9/1638 |
| 9,481,085 | B2 | * | 11/2016 | Igarashi | B25J 9/1641 |
| 9,533,416 | B2 | * | 1/2017 | Garde | B25J 9/1651 |

(Continued)

FOREIGN PATENT DOCUMENTS

| JP | 62-39152 A | 2/1987 |
| JP | 3-234490 A | 10/1991 |

(Continued)

*Primary Examiner* — Ronnie Mancho
(74) *Attorney, Agent, or Firm* — Hauptman Ham, LLP

(57) ABSTRACT

A robot control apparatus for controlling a robot for gripping two workpieces includes an upper limit value changing unit for changing at least one of the upper speed limit value and the upper acceleration limit value of the robot depending on the type and number of workpieces gripped, and an operation controlling unit for controlling the operation of the robot such that at least one of the speed and the acceleration of the robot does not exceed the changed upper speed limit value and upper acceleration limit value.

6 Claims, 3 Drawing Sheets

(56) References Cited

U.S. PATENT DOCUMENTS

| | | | |
|---|---|---|---|
| 2013/0211593 A1* | 8/2013 | Domae | B25J 9/1612 700/258 |
| 2013/0218332 A1* | 8/2013 | Hofmann | B25J 19/0004 700/245 |
| 2014/0025198 A1* | 1/2014 | Mattern | B25J 13/08 700/228 |
| 2014/0121831 A1* | 5/2014 | Kim | B25J 11/0075 700/245 |
| 2014/0154036 A1* | 6/2014 | Mattern | B25J 9/1612 414/729 |
| 2014/0297030 A1* | 10/2014 | Iwasaki | G05B 19/416 700/245 |
| 2015/0352717 A1* | 12/2015 | Mundt | B25J 9/1664 414/730 |

FOREIGN PATENT DOCUMENTS

| | | |
|---|---|---|
| JP | 5-261642 | 10/1993 |
| JP | 5-337872 | 12/1993 |
| JP | 7-64623 A | 3/1995 |
| JP | 7-244520 A | 9/1995 |
| JP | 10-83211 A | 3/1998 |
| JP | 2838428 B2 | 12/1998 |
| JP | 2001-105272 | 4/2001 |
| JP | 2007-66001 A | 3/2007 |
| JP | 2013-139071 A | 7/2013 |
| JP | 2014-193519 A | 10/2014 |

* cited by examiner

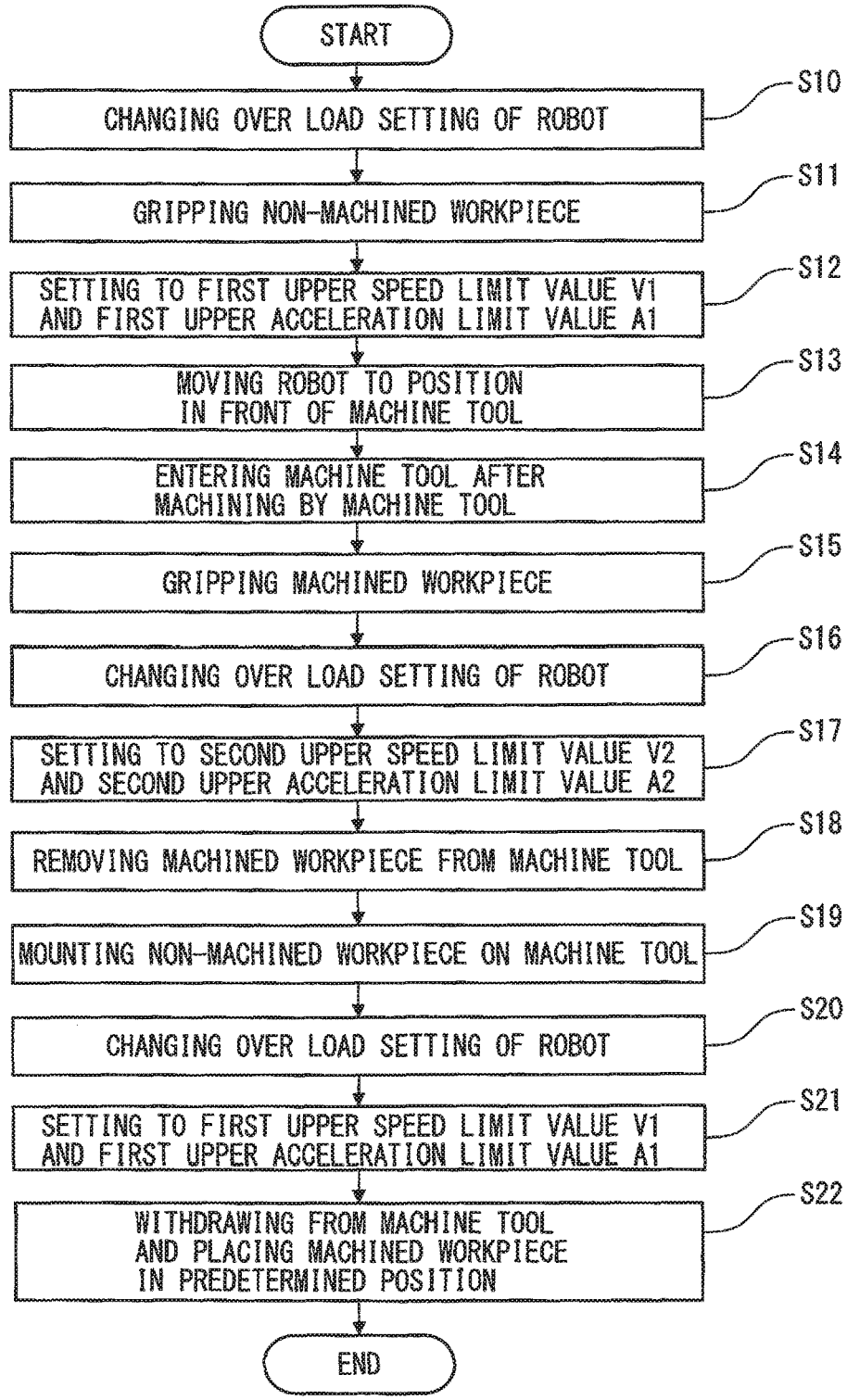

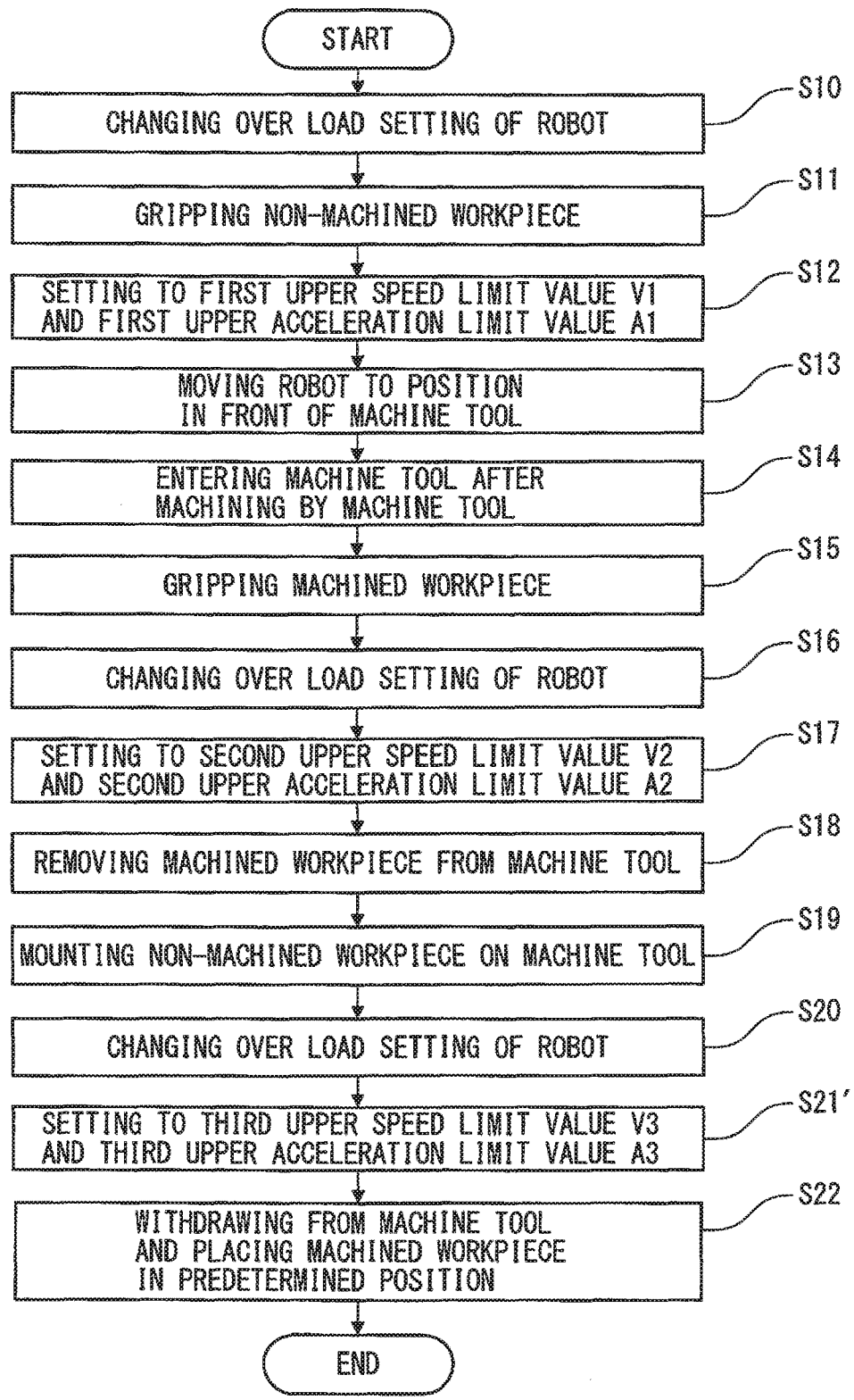

METHOD OF CONTROLLING ROBOT WITH HAND GRIPPING TWO WORKPIECES AND ROBOT CONTROL APPARATUS

RELATED APPLICATIONS

The present application claims priority to Japanese Patent Application Number 2015-142898 filed Jul. 17, 2015, the disclosure of which is hereby incorporated by reference herein in its entirety.

BACKGROUND OF THE INVENTION

1. Field of the Invention

The present invention relates to a robot control method of controlling a robot with a hand for gripping two workpieces and a robot control apparatus for performing the method.

2. Description of the Related Art

Industrial robots are used for carrying out various operations such as assembly operations and welding operations. In such operations, the robots are accelerated to a predetermined speed from a stop state or are stopped by being decelerated from a predetermined speed. Japanese Patent No. 2838428, Japanese Laid-open Patent Publication No. 2007-66001 and Japanese Laid-open Patent Publication No. 7-244520 disclose robots that operate in such a manner.

Japanese Laid-open Patent Publication No. 10-083211 discloses a hand of a so-called double-hand configuration including a first gripping unit and a second gripping unit. A robot including such a hand approaches a machine tool, for example, with the first gripping unit gripping a non-machined workpiece. Then, the robot grips and removes a machined workpiece machined by the machine tool with the second gripping unit and mounts the non-machined workpiece gripped by the first gripping unit on the machine tool. Furthermore, the machined workpiece gripped by the second gripping unit is placed on a workpiece feeder, and a non-machined workpiece is gripped by the first gripping unit from the workpiece feeder.

SUMMARY OF INVENTION

During such an exchange between a non-machined workpiece and a machined workpiece, the hand of the robot needs to grip the two workpieces simultaneously. Therefore, it is desirable to select a robot that accommodates an applied load so as to be able to grip two workpieces simultaneously. A small-sized robot that accommodates a smaller applied load is also operable when the robot hand grips no or one workpiece. However, an excessive load can be applied to the robot when the robot is operated at a predetermined upper speed limit value and/or upper acceleration limit value while gripping two workpieces simultaneously.

The present invention has been made in view of the aforementioned circumstances, and it is an object of the present invention to provide a robot control method which is capable of controlling a robot without the applying of an excessive load to the robot even when the number or type of workpieces gripped varies, and a robot control apparatus for performing the method.

In order to achieve the aforementioned object, according to a first invention, there is provided a robot control apparatus for controlling a robot with a hand for gripping two workpieces, the robot control apparatus including an upper limit value changing unit for changing at least one of the upper speed limit value and the upper acceleration limit value of the robot depending on the type and number of workpieces gripped by the hand, and an operation controlling unit for controlling the operation of the robot such that at least one of the speed and the acceleration of the robot does not exceed the upper speed limit value and the upper acceleration limit value changed by the upper limit value changing unit.

According to a second invention, on the basis of the first invention, the upper speed limit value and the upper acceleration limit value changed by the upper limit value changing unit when one workpiece is gripped by the hand are greater than the upper speed limit value and the upper acceleration limit value changed by the upper limit value changing unit when two workpieces are gripped by the hand.

According to a third invention, on the basis of the first or second invention, the upper speed limit value and the upper acceleration limit value changed by the upper limit value changing unit when one machined workpiece is gripped by the hand are greater than the upper speed limit value and the upper acceleration limit value changed by the upper limit value changing unit when one non-machined workpiece is gripped by the hand.

According to a fourth invention, there is provided a robot control method of controlling a robot with a hand for griping up to two workpieces, the robot control method including: when the hand grips only one workpiece, changing at least one of the upper speed limit value and the upper acceleration limit value of the robot from a first upper speed limit value and a first upper acceleration limit value to a second upper speed limit value and a second upper acceleration limit value which are smaller than the first upper speed limit value and the first upper acceleration limit value, respectively; further gripping an additional workpiece with the hand gripping the one workpiece; when the hand grips the one workpiece and the additional workpiece, changing at least one of the upper speed limit value and the upper acceleration limit value of the robot from the second upper speed limit value and the second upper acceleration limit value to the first upper speed limit value and the first upper acceleration limit value or to a third upper speed limit value and a third upper acceleration limit value which are greater than the first upper speed limit value and the first upper acceleration limit value, respectively; and moving the robot such that the hand gripping the one workpiece and the additional workpiece releases the one workpiece only.

According to a fifth invention, on the basis of the fourth invention, the one workpiece is a non-machined workpiece and the additional workpiece is a machined workpiece.

These and other objects, features and advantages of the present invention will be more apparent from the detailed description of typical embodiments of the present invention illustrated in the accompanying drawings.

BRIEF DESCRIPTION OF THE DRAWINGS

FIG. 2 is a first flow chart illustrating a workpiece exchange operation with the robot control apparatus based on the present invention.

FIG. 3 is a second flow chart illustrating a workpiece exchange operation with the robot control apparatus based on the present invention.

DETAILED DESCRIPTION

Figure 1:
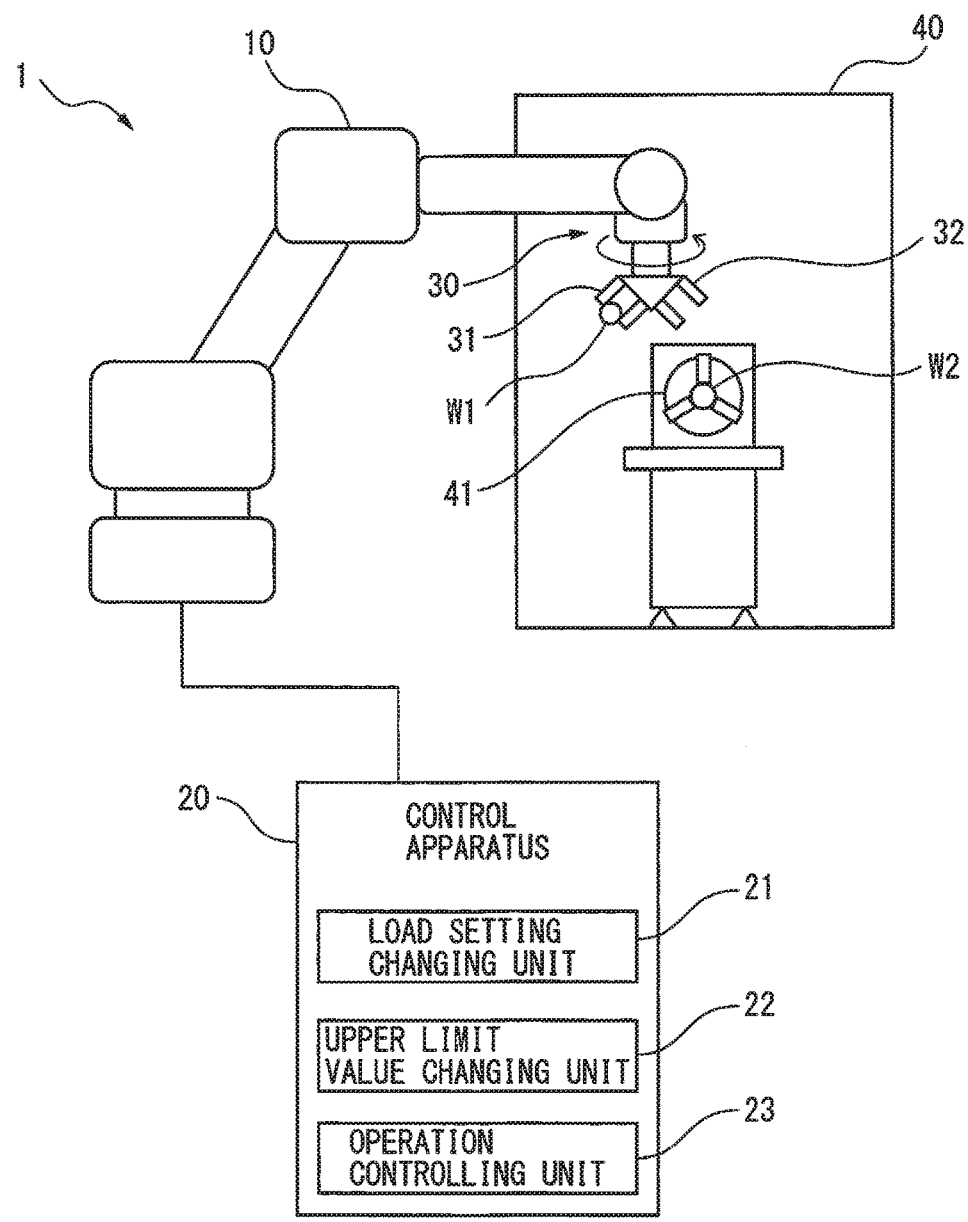
FIG. 1 is a schematic view of a robot control apparatus based on the present invention.

In the following, embodiments of the present invention are described with reference to the accompanying drawings.

In the following drawings, like parts are designated by like reference numerals. For the sake of easy understanding, the scales of the drawings are varied appropriately.

FIG. 1 is a schematic view of a robot control apparatus based on the present invention. As illustrated in FIG. 1, the system 1 includes a robot 10, a machine tool 40, and a control device 20 for controlling the robot 10.

The robot 10 illustrated in FIG. 1 is an articulated robot, but may be a robot of a different configuration. Furthermore, the robot 10 is provided with a hand 30 at an end of the arm. The hand 30 includes a first gripping unit 31 and a second gripping unit 32. The first gripping unit 31 and the second gripping unit 32 are able to be opened and closed to grip workpieces W1, W2, respectively. The workpieces W1, W2 are identical to one another. However, in FIG. 1, the workpiece W1 is a non-machined workpiece which has not been machined by the machine tool 40, and the workpiece W2 is a machined workpiece which has been machined by the machine tool 40.

The machine tool 40 includes a holding unit 41 for holding one of the workpieces W1, W2. When a workpiece, the workpiece W2 in FIG. 1, is held on the holding unit 41, the machine tool 40 performs a predetermined machining action on the workpiece W2.

In FIG. 1, the first gripping unit 31 points in a direction facing away from the machine tool 40, and the second gripping unit 32 points in a direction facing the machine tool 40. As can be seen from FIG. 1, when the axis on the endmost side of the robot 10, e.g., the sixth axis, is rotated, the directions of the first gripping unit 31 and the second gripping unit 32 can be interchanged.

The control device 20 is a digital computer, which performs control such that the robot 10 and the machine tool 40 are interlocked. As illustrated in FIG. 1, the control device 20 includes a load setting changing unit 21 for changing the setting of a load applied to the robot 10, an upper limit value changing unit 22 for changing at least one of the upper speed limit value and the upper acceleration limit value of the robot 10 depending on the type and number of workpieces gripped by the hand 30, and an operation controlling unit 23 for controlling the operation of the robot such that at least one of the speed and the acceleration of the robot 10 does not exceed the upper speed limit value and the upper acceleration limit value changed by the upper limit value changing unit 22.

Although not illustrated in the drawings, a location detector, e.g., an encoder, is mounted on each motor for operating the robot 10. The speed and the acceleration of the robot 10 are properly calculated on the basis of the multiple locations of the robot 10 detected by the location detector every predetermined period of time.

FIG. 2 is a first flow chart illustrating a workpiece exchange operation with the robot control apparatus based on the present invention. In the following, the operation of the control device 20 of the present invention is described with reference to FIGS. 1 and 2. It is noted that, before the content of FIG. 2 is performed, the hand 30 of the robot 10 grips neither the workpiece W1 nor the workpiece W2 and the workpiece W2 is being machined in the machine tool 40.

First, in Step S10, a load of the robot 10 is set by the load setting changing unit 21 to a state in which no workpiece is gripped. Then, in Step S11, the robot 10 is operated such that the first gripping unit 31 of the hand 30 grips the non-machined workpiece W1. Then, in Step S12, the upper speed limit value and the upper acceleration limit value of the robot 10 are set to a first upper speed limit value V1 and a first upper acceleration limit value A1, respectively, by means of the upper limit value changing unit 22 of the control device 20. The first upper speed limit value V1 and the first upper acceleration limit value A1 are values optimized for cases where the robot 10 grips one workpiece. The first upper speed limit value V1, the first upper acceleration limit value A1 and other upper speed limit values and other upper acceleration limit values to be described below are predefined through experiments or the like. Alternatively, these values may be determined by calculation, for example, with the method disclosed in Japanese Examined Laid-open Patent Publication No. 8-20893.

Furthermore, in Step S13, the hand 30 of the robot 10 gripping the non-machined workpiece W1 is moved to a position in front of the machine tool 40. Then, when a machining completion signal indicating that the machine tool 40 has machined the workpiece W2 is received, the robot 10 enters the machine tool 40.

Then, in Step S15, the second gripping unit 32 of the hand 30 grips the machined workpiece W2 held on the holding unit 41 of the machine tool 40. In Step S15, the second gripping unit 32 merely grips the machined workpiece W2, and the machined workpiece W2 is not raised. In Steps S12 to S15, the operation controlling unit 23 operates the robot 10 such that the speed and the acceleration of the robot 10 do not exceed the first upper speed limit value V1 and the first upper acceleration limit value A1, respectively. Therefore, an excessive load is not applied to the robot 10.

Furthermore, in Step S16, the load setting of the robot 10 is changed over by the load setting changing unit 21. Specifically, the load setting corresponding to one workpiece is changed to the load setting corresponding to two workpieces. Then, in Step S17, the upper speed limit value and the upper acceleration limit value of the robot 10 are changed from the first upper speed limit value V1 and the first upper acceleration limit value A1 to a second upper speed limit value V2 and a second upper acceleration limit value A2, respectively, by the upper limit value changing unit 22. The second upper speed limit value V2 and the second upper acceleration limit value A2 are values optimized for cases where the robot 10 grips two workpieces. These values are smaller than the aforementioned first upper speed limit value V1 and first upper acceleration limit value A1, respectively.

Then, in Step S18, the robot 10 raises the machined workpiece W2 and removes it from the machine tool 40. In this case, the hand 30 of the robot 10 is operated while gripping both the non-machined workpiece W1 and the machined workpiece W2. In Step S19, the robot 10 releases the non-machined workpiece W1 from the first gripping unit 31 so that the non-machined workpiece W1 is held on the holding unit 41 of the machine tool 40.

In Steps S18 and S19, the operation controlling unit 23 operates the robot 10 such that the speed and the acceleration of the robot 10 do not exceed the second upper speed limit value V2 and the second upper acceleration limit value A2, respectively. Therefore, an excessive load is not applied to the robot 10.

Then, in Step S20, the load setting of the robot 10 is changed over by the load setting changing unit 21. Specifically, the load setting corresponding to two workpieces is changed to the load setting corresponding to one workpiece. Then, in Step S21, the upper speed limit value and the upper acceleration limit value of the robot 10 are changed from the second upper speed limit value V2 and the second upper acceleration limit value A2 back to the first upper speed limit value V1 and the first upper acceleration limit value A1, respectively, by the upper limit value changing unit 21.

After that, in Step S22, the robot 10 is withdrawn out of the machine tool 40 while gripping the machined workpiece W2 only. Then, the machined workpiece W2 is placed in a predetermined position, and the processing is completed. In Step S22, the operation controlling unit 23 operates the robot 10 such that the speed and the acceleration of the robot 10 do not exceed the first upper speed limit value V1 and the first upper acceleration limit value A1, respectively. Therefore, as described above, an excessive load is not applied to the robot 10.

As described heretofore, according to the present invention, when the robot 10 grips only one of the workpieces W1, W2, the first upper speed limit value V1 and first upper acceleration limit value A1, which are relatively greater, are used. When the robot 10 grips the two workpieces W1, W2, the values are changed to the second upper speed limit value V2 and second upper acceleration limit value A2, which are relatively smaller.

In other words, according to the present invention, the upper speed limit value and the upper acceleration limit value are changed depending on the number of workpieces. Accordingly, even in operations where the number of workpieces gripped varies, e.g., workpiece exchange operations, an excessive load to the robot is prevented.

Accordingly, as described above, when the speed or the like of the robot 10 is controlled so as not to exceed the second upper speed limit value V2 or the like, the robot 10 can be used even if an actual load applied to the robot exceeds a permissible value specified in the specification of the robot. In short, according to the present invention, it will be understood that even a robot 10 with a small weight capacity is able to perform the same operation without being subjected to an excessive load.

In the first embodiment described with reference to FIG. 2, the description was given regarding the operation of exchanging the non-machined workpiece W1 with the machined workpiece W2. Furthermore, the first embodiment is based on the assumption that the weight of the non-machined workpiece W1 is substantially equal to the weight of the machined workpiece W2. Therefore, in the first embodiment, the upper speed limit value V1 and the upper acceleration limit value A1 for gripping the non-machined workpiece W1 only (Step S11) and the upper speed limit value V1 and the upper acceleration limit value A1 for gripping the machined workpiece W2 only (Step S21) are equal, respectively.

However, the weight of the workpiece can be appreciably reduced, for example, by cutting. In such a case, even if values greater than the first upper speed limit value V1 and the first upper acceleration limit value A1 are employed in Step S21 of FIG. 2, the operation can be carried out without applying an excessive load to the robot 10 during the movement of the robot 10.

FIG. 3 is a second flow chart indicating the operation of the robot control apparatus based on the present invention. The descriptions of Steps S11 to S20 and S22 illustrated in FIG. 3 are the same as those given with reference to FIG. 2. Therefore, the descriptions are omitted.

In Step S21' of FIG. 3, the upper speed limit value and the upper acceleration limit value of the robot 10 are changed from the second upper speed limit value V2 and the second upper acceleration limit value A2 to a third upper speed limit value V3 and a third upper acceleration limit value A3, respectively, by the upper limit value changing unit 22. The third upper speed limit value V3 and the third upper acceleration limit value A3 are values optimized for cases where the robot 10 grips only one machined workpiece. These values are greater than the aforementioned first upper speed limit value V1 and first upper acceleration limit value A1, respectively.

Accordingly, when the weight of the machined workpiece W2 is appreciably smaller than the weight of the non-machined workpiece W1, the robot 10 gripping the machined workpiece W2 only is not subjected to an excessive load and a high-speed operation of the robot 10 is allowed.

According to an embodiment, which is not illustrated, for example, the robot 10 gripping a certain type of workpiece WA with the first gripping unit 31 further grips a different type of workpiece WB with a different weight with the second gripping unit 32, and then releases the workpiece WA only. In short, according to the embodiment, which is not illustrated, there are three states: the first state wherein the robot 10 grips the workpiece WA only, the second state wherein the robot 10 grips the workpiece WB only, and the third state wherein the robot 10 grips both workpieces WA, WB.

Then, upper speed limit values and upper acceleration limit values corresponding to the first to third states are predefined. The upper speed limit value and the upper acceleration limit value are changed over by the load setting changing unit 21 according to the states. Accordingly, it will be appreciated that, even if the type of a workpiece gripped varies, the robot 10 can be controlled similarly without applying an excessive load to the robot 10.

In the aforementioned embodiment, the robot 10 is operated such that both the speed and the acceleration of the robot 10 do not exceed the upper speed limit value and the upper acceleration limit value, respectively. However, the robot 10 may be operated such that at least one of the speed and the acceleration of the robot 10 does not exceed the upper speed limit value and the upper acceleration limit value. Such a case is also covered by the scope of the present invention.

EFFECTS OF THE INVENTION

According to the first invention, since the upper speed limit value and/or the upper acceleration limit value are changed depending on the number and type of workpieces, the robot can be controlled without applying an excessive load to the robot even if the number or type of workpieces gripped varies.

According to the second invention, since the upper speed limit value and/or the upper acceleration limit value for gripping two workpieces are smaller than the upper speed limit value and/or the upper acceleration limit value for gripping one workpiece, excessive load applied to the robot is prevented.

According to the third invention, since the upper speed limit value and/or the upper acceleration limit value for gripping a non-machined workpiece is smaller than the upper speed limit value and/or the upper acceleration limit value for gripping a machined workpiece, excessive load applied to the robot is prevented.

According to the fourth and fifth inventions, since the values are changed to relatively smaller second upper speed limit value and/or second upper acceleration limit value when the robot grips one workpiece and an additional workpiece, the robot can be controlled without an excessive load to the robot. Furthermore, even a robot the weight capacity of which is smaller than that of known art is capable of performing the same operation without applying an excessive load.

The present invention has been described in connection with the typical embodiments. However, those skilled in the art would appreciate that the above-specified modifications and other modifications, omissions, and additions can be made without departing from the scope of the present invention.

The invention claimed is:

1. A robot control apparatus for controlling a robot, the robot having a hand configured for gripping two workpieces, the robot control apparatus comprising:
    an upper limit value changing unit for changing at least one of an upper speed limit value and an upper acceleration limit value of the robot depending on a type and number of workpieces gripped by the hand; and
    an operation controlling unit for controlling operation of the robot such that at least one of speed and acceleration of the robot does not exceed the upper speed limit value and the upper acceleration limit value changed by the upper limit value changing unit, wherein,
    when the hand grips one workpiece, the upper limit value changing unit is configured to set at least one of the upper speed limit value and the upper acceleration limit value as a first upper speed limit value and a first upper acceleration limit value,
    when the hand gripping the one workpiece further grips an additional workpiece, the upper limit value changing unit is configured to change at least one of
        the upper speed limit value from the first upper speed limit value to a second upper speed limit value smaller than the first upper speed limit value, and
        the upper acceleration limit value from the first upper acceleration limit value to a second upper acceleration limit value smaller than the first upper acceleration limit value, and
    when the hand releases only the one workpiece while continuing to grip the additional workpiece, the upper limit value changing unit is configured to change at least one of
        the upper speed limit value from the second upper speed limit value to the first upper speed limit value or to a third upper speed limit value greater than the first upper speed limit value, and
        the upper acceleration limit value from the second upper acceleration limit value to the first upper acceleration limit value or to a third upper acceleration limit value greater than the first upper acceleration limit value.

2. A robot control method of controlling a robot, the robot having a hand configured for gripping two workpieces, the robot control method comprising:
    when the hand grips only one workpiece, setting at least one of an upper speed limit value and an upper acceleration limit value of the robot to a first upper speed limit value and a first upper acceleration limit value;
    further gripping an additional workpiece by the hand which grips the one workpiece;
    when the hand grips the one workpiece and the additional workpiece, changing at least one of
        the upper speed limit value from the first upper speed limit value to a second upper speed limit value smaller than the first upper speed limit value, and
        the upper acceleration limit value from the first upper acceleration limit value to a second upper acceleration limit value smaller than the first upper acceleration limit value;
    releasing only the one workpiece from the hand while continuing to grip the additional workpiece, changing at least one of
        the upper speed limit value from the second upper speed limit value to the first upper speed limit value or to a third upper speed limit value greater than the first upper speed limit value, and
        the upper acceleration limit value from the second upper acceleration limit value to the first upper acceleration limit value or to a third upper acceleration limit value greater than the first upper acceleration limit value; and
    moving the robot such that at least one of speed and acceleration of the robot does not exceed the upper speed limit value and the upper acceleration limit value.

3. The robot control method according to claim 2, wherein the one workpiece is a non-machined workpiece and the additional workpiece is a machined workpiece.

4. The robot control apparatus according to claim 1, wherein the one workpiece is a non-machined workpiece and the additional workpiece is a machined workpiece.

5. A robot control apparatus for controlling a robot, the robot having a hand configured for gripping two workpieces, the robot control apparatus comprising:
    a controller configured to
        change at least one of an upper speed limit value and an upper acceleration limit value of the robot depending on a type and number of workpieces gripped by the hand; and
        control operation of the robot such that at least one of speed and acceleration of the robot does not exceed the changed upper speed limit value and the changed upper acceleration limit value, wherein,
    when the hand grips one workpiece, the controller is configured to set at least one of the upper speed limit value and the upper acceleration limit value as a first upper speed limit value and a first upper acceleration limit value,
    when the hand gripping the one workpiece further grips an additional workpiece, the controller is configured to change at least one of
        the upper speed limit value from the first upper speed limit value to a second upper speed limit value smaller than the first upper speed limit value, and
        the upper acceleration limit value from the first upper acceleration limit value to a second upper acceleration limit value smaller than the first upper acceleration limit value, and
    when the hand releases only the one workpiece while continuing to grip the additional workpiece, the controller is configured to change at least one of
        the upper speed limit value from the second upper speed limit value to the first upper speed limit value or to a third upper speed limit value greater than the first upper speed limit value, and
        the upper acceleration limit value from the second upper acceleration limit value to the first upper acceleration limit value or to a third upper acceleration limit value greater than the first upper acceleration limit value.

6. The robot control apparatus according to claim 5, wherein the one workpiece is a non-machined workpiece and the additional workpiece is a machined workpiece.

* * * * *